(12) United States Patent
Winger et al.

(10) Patent No.: US 7,595,743 B1
(45) Date of Patent: Sep. 29, 2009

(54) SYSTEM AND METHOD FOR REDUCING STORAGE REQUIREMENTS FOR CONTENT ADAPTIVE BINARY ARITHMETIC CODING

(75) Inventors: Lowell L. Winger, Waterloo (CA); Eric C. Pearson, Conestogo (CA)

(73) Assignee: LSI Corporation, Milpitas, CA (US)

( * ) Notice: Subject to any disclaimer, the term of this patent is extended or adjusted under 35 U.S.C. 154(b) by 778 days.

(21) Appl. No.: 11/259,596

(22) Filed: Oct. 26, 2005

(51) Int. Cl.
*H03M 7/00* (2006.01)
(52) U.S. Cl. .................................. 341/107; 341/50
(58) Field of Classification Search ........... 341/106, 341/107, 50; 382/219, 247; 375/240.12
See application file for complete search history.

(56) References Cited

U.S. PATENT DOCUMENTS

| | | | |
|---|---|---|---|
| 6,927,710 B2 * | 8/2005 | Linzer et al. | 341/107 |
| 7,061,410 B1 * | 6/2006 | Pearson et al. | 341/107 |
| 7,408,487 B2 * | 8/2008 | Cho | 341/107 |
| 7,460,042 B2 * | 12/2008 | Oshikiri et al. | 341/107 |

OTHER PUBLICATIONS

Gary J. Sullivan, et al., Video Compression—From Concepts to the H.264/AVC Standard, Proceedings of the IEEE, Jan. 2005, vol. 93, No. 1, pp. 18-31.

Thomas Wiegand, et al., Overview of the H.264/AVC Video Coding Standard, IEEE Transactions on Circuits and Systems for Video Technology, Jul. 2003, pp. 1-19.

Detlev Marpe, et al., Context-Based Adaptive Binary Arithmetic Coding in the H.264/AVC Video Compression Standard, IEE Transactions on Circuits and Systems for Video Technology, 2003, pp. 1-18.

Thomas Sikora, Trends and Perspectives in Image and Video Coding, Proceedings of the IEEE, Jan. 2005, vol. 93, No. 1, pp. 6-17.

Gary J. Sullivan, et al., The H.264/AVC Advanced Video Coding Standard: Overview and Introduction to the Fidelity Range Extensions, Presented at the SPIE Conference on Applications of Digital Image Processing XXVII, Aug. 2004, pp. 1-21.

\* cited by examiner

*Primary Examiner*—Brian Young
(74) *Attorney, Agent, or Firm*—Christopher P. Maiorana, PC

(57) ABSTRACT

A system for reducing storage requirements for content-adaptive binary arithmetic coding (CABAC) is provided. The system includes a transcode engine performing CABAC on a video data stream. The transcode engine receives save data, stops CABAC, and converts the video data stream into sub-network abstraction layer (NAL) unit state data. An entropy state data storage system receiving the sub-NAL unit state data and stores the sub-NAL unit state data. The transcode engine subsequently receives restore data, extracts the sub-NAL unit state data from the entropy state data storage system, and re-starts CABAC on the video stream data.

24 Claims, 3 Drawing Sheets

SYSTEM AND METHOD FOR REDUCING STORAGE REQUIREMENTS FOR CONTENT ADAPTIVE BINARY ARITHMETIC CODING

FIELD OF THE INVENTION

The present invention relates generally to transcoding of video data, and more specifically to a system and method for reducing storage requirements for content adaptive binary arithmetic coding.

BACKGROUND OF THE INVENTION

Existing coder-decoder systems using entropy transcoding to reduce complexity and enable real-time encode/decode, must use quite large transcode buffers, and must also make provision for additional buffer room in the input buffer. The fundamental reason for requiring this extra data storage is that prior system transcode engines must operate on complete network abstraction layer (NAL) units (i.e. maxTranscodeUnit=max NAL size in the figure above) and cannot be used to perform any other action before the processing of the current NAL completes. If the transcode engine is to run efficiently without stalling, the input buffers to the transcode engine must be able to contain at least a complete NAL unit in addition to buffer space for building up the next complete NAL unit so that the transcode engine can do something else (e.g. process another stream) until a complete NAL is formed for a particular stream. This data storage allows sufficient buffer room for the processes feeding the transcode engine to be able to work on filling/forming the next NAL unit while the transcode engine is operating on the previous NAL unit, and minimizes the risk of transcoder stalling, at the cost of the additional buffer data storage.

The exact storage size will vary, but typically several maximum NAL sizes are required for these additional buffers. The transcode buffer may need to be even larger, to account for expansion from content adaptive binary arithmetic coding (CABAC) to content adaptive variable length coding (CAVLC). The amount of additional data storage that is required can be as great as the amount needed to store 2.5 uncompressed pictures.

The transcode engine can be a single hardware unit that is used to perform multiple simultaneous encode and decode operations. Typically, one high density (HD) television decoder with one standard density (SD) television encoder, or two decoders (SD or HD) with one encoder (SD or HD) are found in many consumer applications.

In the prior art, the transcode operation cannot be interrupted while processing a NAL unit. The advantage of this is that there is no need to store state information when switching between processing of different streams, since each NAL unit can be independently entropy decoded/transcoded. The disadvantage is the large buffer memories. In contrast, since decode from CAVLC is typically performed on a host processor that may potentially be interrupted/stored and restarted/restored on a row of macroblocks (for example) basis, the decode transcode buffer size is only dictated by the smallest unit that the decode transcode engine can process (one expanded max NAL size), and need not be sized significantly larger to accommodate it not being able to store/restore its state in the middle of a row of macroblocks (since the maximum size of a compressed row of macroblocks is much smaller than the maximum size of a compressed picture).

SUMMARY OF THE INVENTION

Therefore, a method for decreasing the data storage requirements for CABAC transcoders is required.

In one exemplary embodiment, a system for reducing storage requirements for CABAC is provided. The system includes a transcode engine performing CABAC on a video data stream. The transcode engine receives save data, stops CABAC, and converts the video data stream into sub-network abstraction layer (NAL) unit state data. An entropy state data storage system receiving the sub-NAL unit state data and stores the sub-NAL unit state data. The transcode engine subsequently receives restore data, extracts the sub-NAL unit state data from the entropy state data storage system, and re-starts CABAC on the video stream data.

Those skilled in the art will further appreciate the advantages and superior features of the invention together with other important aspects thereof on reading the detailed description that follows in conjunction with the drawings.

DETAILED DESCRIPTION OF PREFERRED EMBODIMENTS

Figure 1:
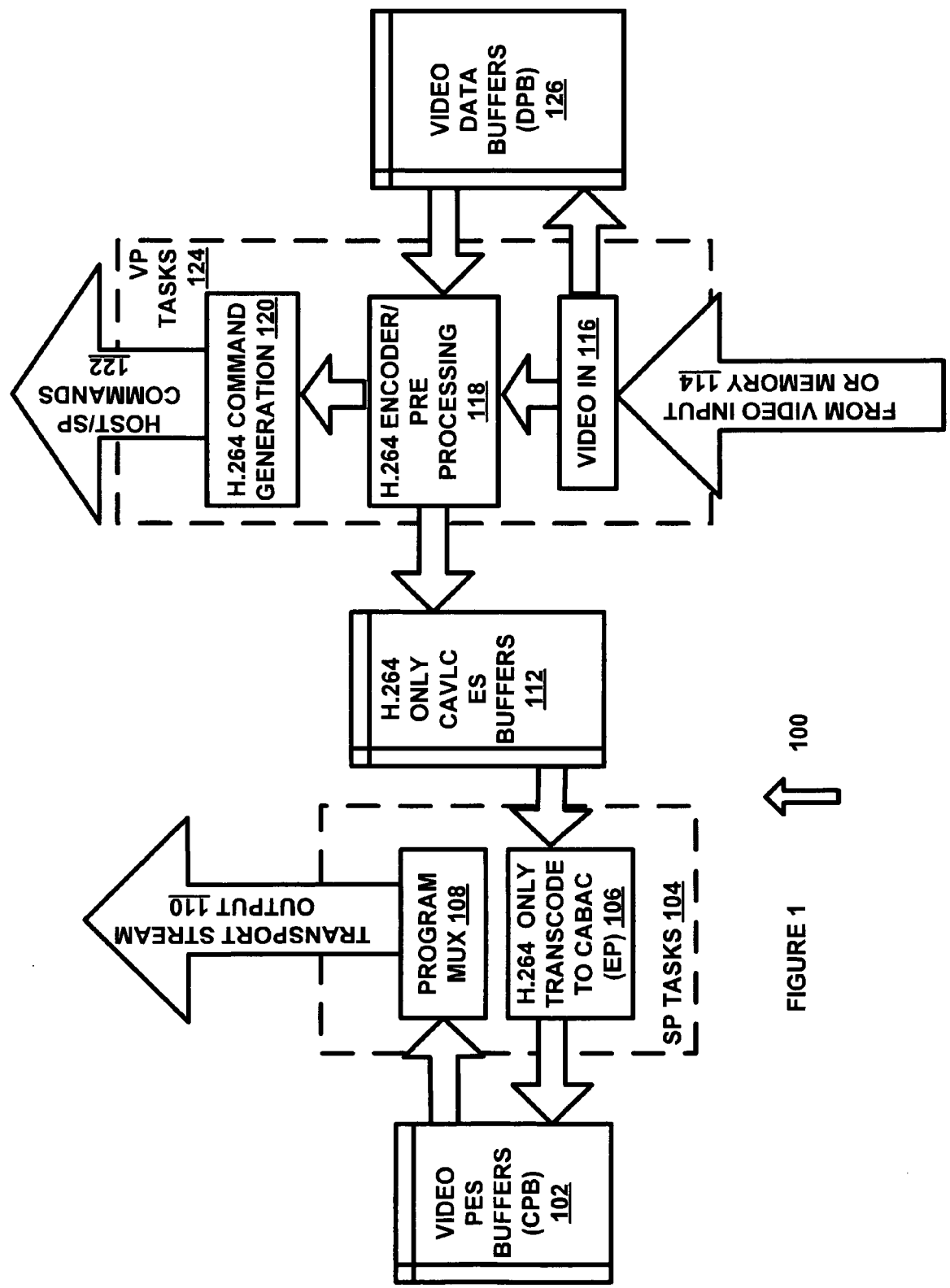
FIG. 1 is a diagram of a system for reducing storage requirements for CABAC in accordance with an exemplary embodiment of the present invention.

In the description which follows, like parts are marked throughout the specification and drawing with the same reference numerals, respectively. The drawing figures may not be to scale and certain components may be shown in generalized or schematic form and identified by commercial designations in the interest of clarity and conciseness.

FIG. 1 is a diagram of a system 100 for reducing storage requirements for CABAC in accordance with an exemplary embodiment of the present invention. System 100 can be implemented in hardware, software, or a suitable combination of hardware and software, and can be one or more software systems operating on a digital signal processor platform or other suitable hardware or software systems.

System 100 receives video data from video input or memory 114, and generates transport stream output 110. Video data is provided to video input 116, which provides the video data to H.264 encoder/preprocessing 118. The video input data can also be buffered in video data buffers (DPB) 126. As part of the transport stream output generation, H.264 encoder/pre processing 118 provides data to H.264 command generation 120, which generates host/SP commands 122. Data output from H.264 encoder/preprocessing 118 is also provided to H.264 only CAVLC ES buffers 112, which store state information that is used by the entropy processor of H.264 only transcode to CABAC (EP) 106.

System 100 includes video PES buffers (CPB) 102, which receive video packetized elementary stream (PES) data and buffer the video PES data for processing. Video PES buffer (CPB) 102 provides data to program multiplexer 108, which generates transport stream output 110. This data can be received from H.264 only transcode to CABAC (EP) 106, which performs CABAC transcoding and other suitable processes. In one exemplary embodiment, H.264 only transcode to CABAC (EP) 106 can perform CABAC to CAVLC coding in a decode operation, and can perform CAVLC to CABAC coding in an encode operation. In the exemplary embodiment shown in FIG. 1, decoding is being performed.

In one exemplary embodiment, program multiplexer 108 and H.264 only transcode to CABAC (EP) 106 can be implemented as system processor tasks 104. In this exemplary embodiment, the system processor normally parses a bit stream to separate the raw compressed video and audio bit streams from out of an MPEG transport stream which is carrying H.264 video data or other suitable data, but can also be used to perform transcoding. As a result, transcoding may need to be interrupted, which previously required storage of the entire NAL unit. The present invention reduces the storage requirements by allowing interruption of transcoding without storage of an entire NAL unit.

H.264 only CAVLC ES buffers 112 provide buffered state data or content adaptive variable length coding data to H.264 only transcode to CABAC (EP) 106. In one exemplary embodiment, H.264 only CAVLC ES buffers 112 buffer sub-network abstraction layer (NAL) unit state data, such that the size of H.264 only CAVLC ES buffers 112 is significantly less than the size required by the prior art. In this exemplary embodiment, prior art buffers, with associated encoders like H.264 only transcode to CABAC (EP) 106 that do not store state data but only perform CABAC encoding or decoding on a NAL unit to completion, may typically range up to 2.5 uncompressed picture sizes, whereas utilizing the present invention, the H.264 only CAVLC ES buffers 112 can be less than one picture size. The present invention allows H.264 only transcode to CABAC (EP) 106 to stop processing a NAL unit of H.264 data and to restart CABAC coding of that NAL unit, such as where the transcode engine must perform other tasks. Thus, storage in the buffer of the entire NAL data set is not required.

H.264 only CAVLC ES buffers 112 receive data from H.264 encoder/preprocessing 118. Data from video input or memory 114 is provided to video input 116, which stores the video data buffers (DPB) 126. The data from video input 116 or video data buffers (DPB) 126 is provided to H.264 encoder/preprocessing 118. In addition to providing the video output or memory data to H.264 only CAVLC ES buffers 112, H.264 encoder/preprocessing 118 provides the video data to H.264 command generation 120. The commands generated by H.264 command generation 120 are output as host/SP commands 122. Furthermore, video input 116, H.264 encoder/preprocessing 118, and H.264 command generation 120 can be implemented as video processor tasks 124, where the video processor performs the video decoding task taking the raw compressed video bit stream and turning it back into video data.

In operation, system 100 stores and restores all entropy state information on a unit smaller than a NAL unit, such as a row of macroblocks or on a per macroblock basis, where (max transcode unit)=(max compressed macro block row) or (max compressed macro block size), respectively. Likewise, the CAVLC decode on the host processor will use a similarly sized unit for its store-restore capabilities such that all buffer size requirements and capabilities are matched in the system, regardless of whether (max decode unit)=(max transcode unit).

System 100 allows buffer sizes to be substantially reduced, such that instead of 2.5 uncompressed picture sizes, buffers sized for macroblock based units can be used, which will be much less than one uncompressed picture size, i.e. essentially insignificant (different by an order of magnitude from overall memory usage requirements) in terms of memory usage of the complete systems.

System 100 has the ability to store/restore between a large number of potential entropy coding states, the most significant being entropy coding context states and engine status registers. In one exemplary embodiment, system 100 can store at least two complete states at any time, from which a state may be restored and transcode may be restarted, and to store a third state while simultaneously restoring one of the previously stored states and restarting transcode on the stream associated with that stored state. With this provision, it is possible for the system to switch as required to maximize utilization of the transcode engine and to minimize buffer storage, such as by switching at the end a single macroblock, at the end of each row of macroblocks, or in other suitable manners. Transcoding in this manner allows one of two or more video data streams of a system to be processed by a transcoder, such as in a two decode, one encode system.

The store/restore architecture for the transcode engine has been difficult to configure using prior art systems, as no standard for the encode/decode complexity for a row of macroblocks for CABAC was known. Although the number of bits in a row of macroblocks is bounded by the constraint that individual macroblocks may not be expanded in H.264, the bin to bit ratio (bin count being an indicator of CABAC complexity) is only bounded on a picture level (typically the unit chose for a NAL), and not on the macroblock level. A worst-case bitstream would require the CABAC to transcode a row of macroblocks and could conceivably require so many cycles that a large transcode buffer is required. In practice, however, the complexity would have to be bounded. The development of benchmark bitstreams with worst-case CABAC complexity allows the transcode buffer size to be determined to decode worst-case streams in real time. With a traditional (nonsafe/restore transcode architecture) there is no design value to benchmark bitstreams, since the buffer sizes are much smaller than necessary to decode benchmark bit-streams. The prior art is constrained more by the fact that transcode is uninterruptible on a NAL than by concern about worst-case CABAC transcode/decode/encode complexity.

Figure 2:
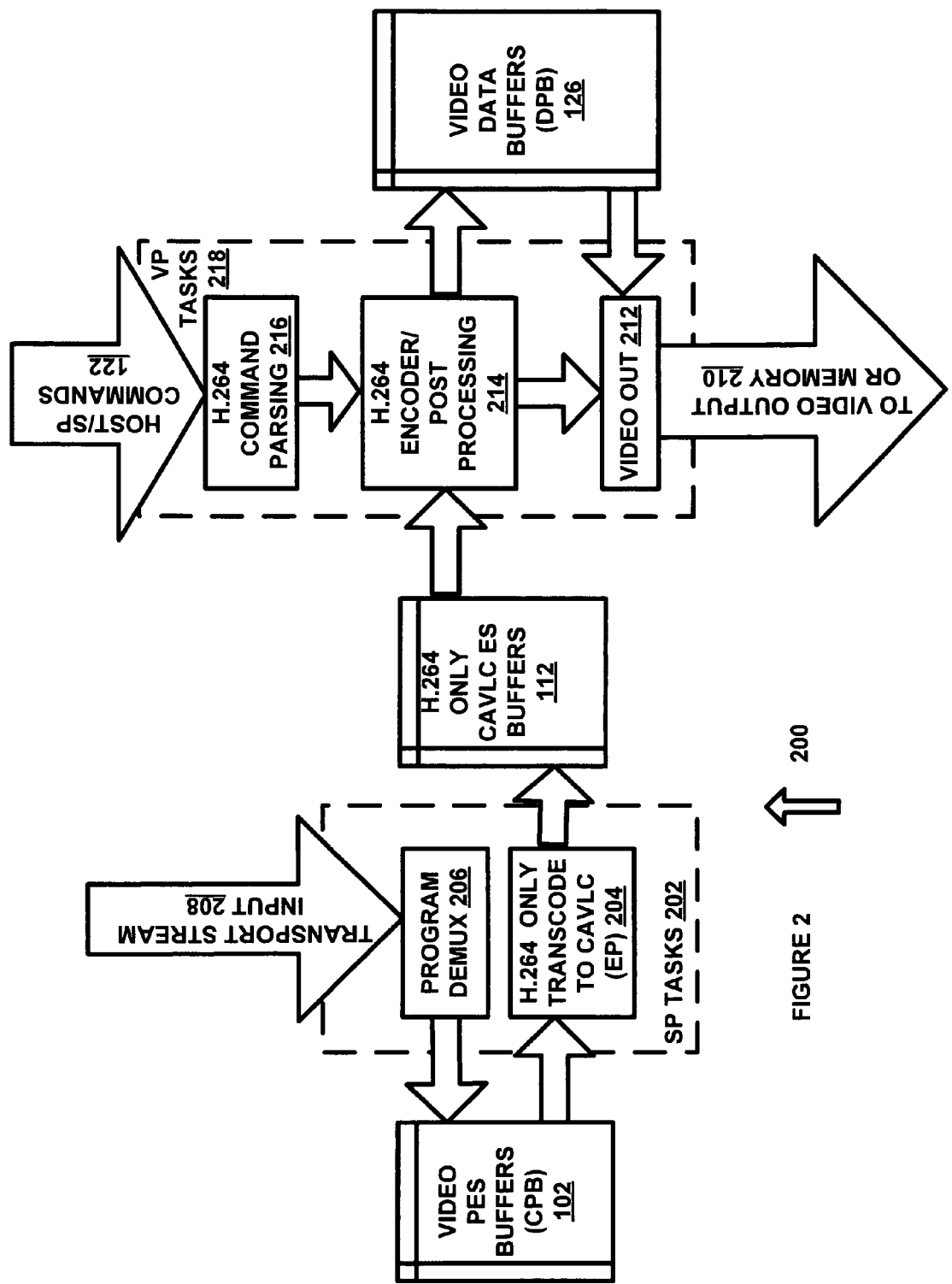
FIG. 2 is a diagram of a system for performing video encoding in accordance with an exemplary embodiment of the present invention.

FIG. 2 is a diagram of a system 200 for performing video encoding in accordance with an exemplary embodiment of the present invention. System 200 includes transport stream input 208, which is received by program demutiplexer 206. Program demultiplexer 206 provides the transport stream input 208 to video PES buffer (CPB) 102, which then provides the buffer data to H.264 only transcode to CAVLC (EP) 204. Both program demultiplexer 206 and H.264 only transcode to CAVLC (EP) 204 can be implemented as system processor tasks 202 or in other suitable configurations.

H.264 only transcode to CAVLC (EP) 204 performs CABAC to CAVLC transcoding. In one exemplary embodiment, H.264 only transcode to CAVLC (EP) 204 provides data to H.264 only CAVLC ES buffers 112 that defines one or more state variables of the transport stream input 208. In this exemplary embodiment, processing of the transport stream input 208 can be stopped in the middle of a NAL unit, such that H.264 only CAVLC ES buffers 112 can be significantly smaller than systems requiring complete processing of an entire NAL unit.

System 200 also includes H.264 command parsing 216, H.264 encoder/post processing 214, and video output 212, each of which can be implemented as video processor tasks 218 or in other suitable manners. Host/SP commands 122 are received by H.264 command parsing 216, and are used to control H.264 encoder/post processing 214 processing of data received from H.264 only CAVLC ES buffers 112. H.264 encoder/post processing 214 provides output to video data buffers (DPB) 126 and video output 212. Video output 212 generates the video data provided through video output or memory 210.

In operation, system 200 allows a transport stream input to be decoded for transmission to a video output or memory, and substantially reduces the buffer size requirements such that sub-NAL units can be stored during the processing of a NAL unit. In this exemplary embodiment, system 200 allows state information for rows of macroblocks or individual macroblocks to be stored in H.264 only CAVLC ES buffers 112.

Figure 3:
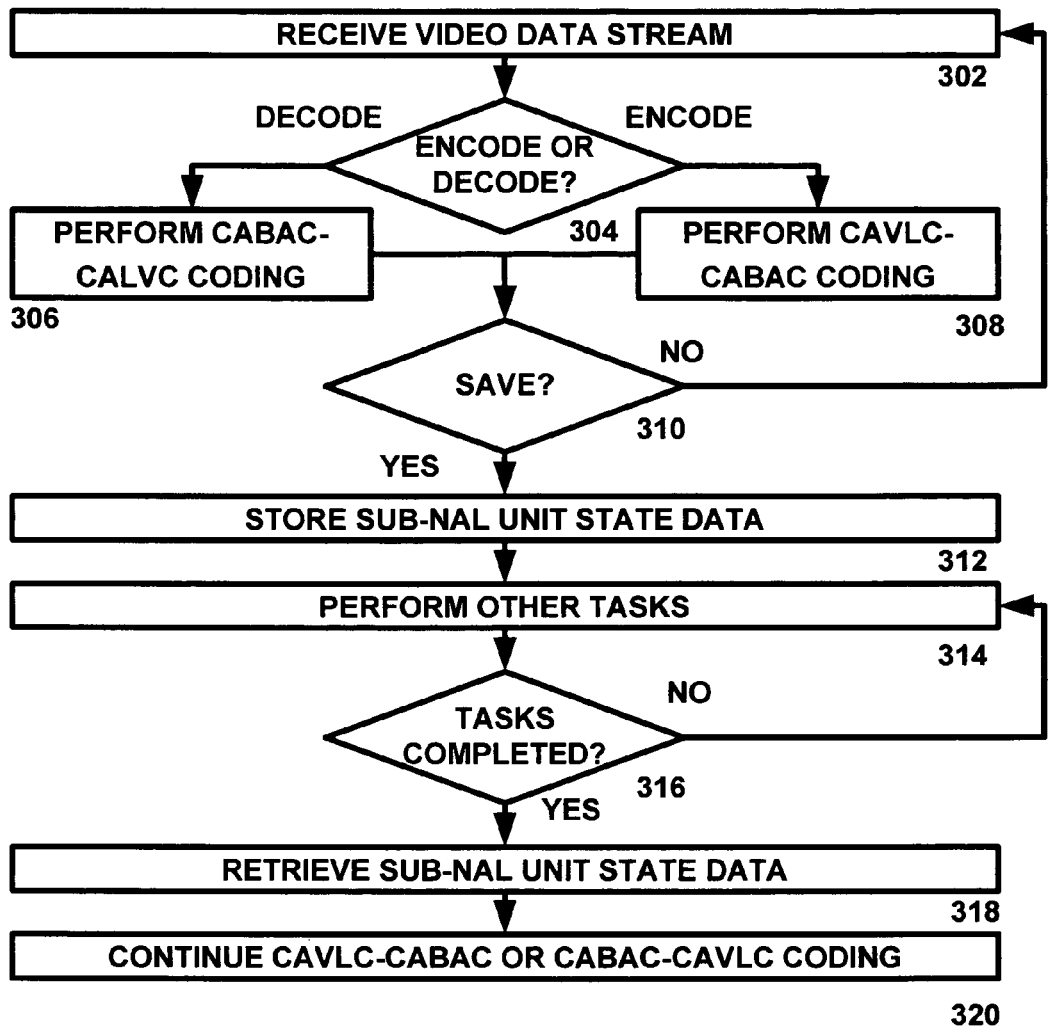
FIG. 3 is a flow chart of a method for encoding or decoding video data stream so as to perform CABAC to CAVLC coding or CAVLC to CABAC coding with reduced data buffering requirements, to allow CABAC coding to be stopped on a sub-NAL basis, in accordance with the exemplary embodiment of the present invention.

FIG. 3 is a flow chart of a method 300 for encoding or decoding a video data stream so as to perform CABAC to CAVLC coding or CAVLC to CABAC coding with reduced data buffering requirements, and to allow CABAC coding to be stopped on a sub-NAL basis, in accordance with an exemplary embodiment of the present invention. Method 300 begins at 302 where a video data stream is received. In one exemplary embodiment, the video data stream can be a transport stream, such as where the transport stream is being decoded. Likewise, the video data stream can be a raw video feed received from a video input or memory and can be converted to a transport stream, such as where the video data is being encoded. The method then proceeds to 304.

At 304, the method proceeds to 306 or 308 depending on whether or not the video data stream is being encoded or decoded. The decision of whether the video data is being encoded or decoded can be made by a processor, can be based on the input at which the video data stream is being received at, or in other suitable manners.

If the video data stream is being decoded, the method proceeds to 306 where an entropy processor or other suitable processor performs CABAC to CAVLC coding. Otherwise, if the video data stream is being encoded, the method proceeds to 308 where the entropy processor or other suitable processors perform CAVLC to CABAC coding. Other suitable conversions can also or alternatively be performed. The method then proceeds to 310.

At 310, it is determined whether it is necessary to save the current state information. For example, the entropy processor or other suitable systems may be needed to perform processing of other streams, such as in a two decode/one encode system, or for other tasks. If it is determined that saving of the data is required, such as sub-NAL unit state data for an individual macroblock or a line of macroblocks in H.264 or other suitable data, the method proceeds to 312, otherwise the method returns to 302 where the video stream data continues to be received.

At 312, sub-NAL unit state data is stored. In one exemplary embodiment, the sub-NAL unit state data can include entropy coding context states, engine status registers, or other suitable data. The method then proceeds to 314 where the processor that was performing the encode or decode operations can perform other tasks, such as transcoding of other streams.

At 316 it is determined whether the processing tasks have been completed, such as upon receipt of a command from a system command processor or other suitable data. If it is determined that the tasks are not completed at 316 the method returns to 314, otherwise the method proceeds to 318.

At 318 the sub-NAL unit state data is retrieved from the buffer or storage. The CAVLC to CABAC or CABAC to CAVLC coding is then resumed at 320, such as by continuing processing of the video data stream such as a transport stream or raw video stream, using the stored state data to reduce the amount of storage requirements that would otherwise be required.

In operation, method 300 allows the storage requirements for processing video data to be reduced by allowing state information to be stored for sub-NAL units of data, such as rows of macro blocks or individual macro blocks. In this exemplary embodiment, a transcode processor can stop transcode processing and can perform other tasks as needed to allow real time delivery of video data or transcoding of video data to be performed.

In another exemplary embodiment, a general purpose video codec format transcoding system is provided. A central computing/transcoding resource is provided, such as a general purpose computing platform, which has the bandwidth and processing capability to transcode multiple streams of video data and to maintain the individual real time constraints on each of those streams. Normally, transcoding is performed on pre-determined units, such as GOPs (group of pictures), pictures, or slices. Because the size of such pre-determined units can vary widely, memory buffers are required to buffer the streams sufficiently so no stalling of the central resource occurs waiting for input data or output data storage. The present invention can be used advantageously with such central computing/transcoding resources to allow the transcode of a given stream to be interrupted at an arbitrary point, where the transcode state variables are stored such that the transcode process can be restored later. Transcoding can then be switched to a different stream, so as to allow a significant reduction in buffer memory. In this exemplary embodiment, the currently non-active stream does not need to be buffered, which reduces buffer storage requirements.

In another exemplary embodiment, a general purpose real time video codec, which encodes/decodes video data, is provided. Existing prior art embodiments work on a frame, slice or macroblock row before switching between encode or decode. To maintain or improve efficiency and reduce memory buffering, the encode/decode operation can be interrupted at an arbitrarily finer resolution.

Although exemplary embodiments of a system and method of the present invention have been described in detail herein, those skilled in the art will also recognize that various substitutions and modifications can be made to the systems and methods without departing from the scope and spirit of the appended claims.

What is claimed is:

1. A system for reducing storage requirements for content-adaptive binary arithmetic coding (CABAC), comprising:
   a transcode engine adapted to perform CABAC on a video data stream, receiving save data, stopping CABAC, and converting the video data stream into sub-network abstraction layer (NAL) unit state data;
   an entropy state data storage system adapted to receive the sub-NAL unit state data and storing the sub-NAL unit state data; and
   the transcode engine receiving restore data, extracting the sub-NAL unit state data from the entropy state data storage system, and re-starting CABAC on the video stream data, wherein the sub-NAL unit state data comprises engine status register data.

2. The system of claim 1 wherein the sub-NAL unit state data comprises entropy coding context states.

3. The system of claim 1 wherein the entropy state data storage system comprises a transcode buffer having a size less than one uncompressed picture size.

4. The system of claim 1 wherein the transcode engine comprises an entropy processor.

5. The system of claim 1 wherein the transcode engine comprises a system processor task.

6. The system of claim 1 wherein the transcode engine performs content adaptive variable length coding (CAVLC) to CABAC transcoding.

7. The system of claim 1 wherein the transcode engine performs CABAC to CAVLC transcoding.

8. The system of claim 1 wherein the stopping of the CABAC occurs at a time when processing cannot proceed further due to at least one of (i) no input data available, and (ii) no output storage available.

9. The system of claim 8 wherein the CABAC state resolution is less than one bit.

10. The system of claim 1 wherein the stopping of the CABAC of a first stream occurs at a specified point, entropy state data storage system saves a corresponding transcode state, and the transcode engine switches transcoding to a different stream.

11. The system of claim 1 wherein the stopping of the CABAC occurs at a predetermined time.

12. A method for reducing storage requirements for content-adaptive binary arithmetic coding (CABAC), comprising:
performing CABAC on a video data stream;
receiving save data;
stopping CABAC on the video data stream;
converting the video data stream into sub-network abstraction layer (NAL) unit state data;
storing the sub-NAL unit state data;
receiving restore data;
extracting the sub-NAL unit state data from storage; and
re-starting CABAC on the video stream data, wherein the stopping of the CABAC of a first stream occurs at a specified point, an entropy state data storage system saves a corresponding transcode state, and a transcode engine switches transcoding to a different stream.

13. The method of claim 12 wherein storing the sub-NAL unit state data comprises storing entropy coding context states.

14. The method of claim 12 wherein storing the sub-NAL unit state data comprises storing engine status register data.

15. The method of claim 12 wherein performing CABAC on the video data stream comprises performing CABAC on the video data stream using an entropy processor.

16. The method of claim 12 wherein performing CABAC on the video data stream comprises performing CABAC on the video data stream using a system processor task.

17. The method of claim 12 wherein performing CABAC further comprises performing CAVLC to CABAC.

18. The method of claim 12 wherein performing CABAC further comprises performing CABAC to CAVLC.

19. The method of claim 12 wherein the stopping of the CABAC occurs at a time when processing cannot proceed further due to at least one of (i) no input data available, and (ii) no output storage available.

20. The method of claim 19 wherein the CABAC state resolution is less than one bit.

21. The method of claim 12 wherein the stopping of the CABAC occurs at a predetermined time.

22. A system for reducing storage requirements for content-adaptive binary arithmetic coding (CABAC), comprising:
a transcode engine adapted to perform CABAC on a video data stream, receiving save data, stopping CABAC, and converting the video data stream into sub-network abstraction layer (NAL) unit state data;
an entropy state data storage system adapted to receive the sub-NAL unit state data and storing the sub-NAL unit state data, wherein the entropy state data storage system comprises a transcode buffer having a size less than one uncompressed picture size; and
the transcode engine receiving restore data, extracting the sub-NAL unit state data from the entropy state data storage system, and re-starting CABAC on the video stream data.

23. A system for reducing storage requirements for content-adaptive binary arithmetic coding (CABAC), comprising:
a transcode engine adapted to perform CABAC on a video data stream, receiving save data, stopping CABAC, and converting the video data stream into sub-network abstraction layer (NAL) unit state data;
an entropy state data storage system adapted to receive the sub-NAL unit state data and storing the sub-NAL unit state data; and
the transcode engine receiving restore data, extracting the sub-NAL unit state data from the entropy state data storage system, and re-starting CABAC on the video stream data, wherein the stopping of the CABAC occurs at a time when processing cannot proceed further due to at least one of (i) no input data available, and (ii) no output storage available.

24. A system for reducing storage requirements for content-adaptive binary arithmetic coding (CABAC), comprising:
a transcode engine adapted to perform CABAC on a video data stream, receiving save data, stopping CABAC, and converting the video data stream into sub-network abstraction layer (NAL) unit state data;
an entropy state data storage system adapted to receive the sub-NAL unit state data and storing the sub-NAL unit state data; and
the transcode engine receiving restore data, extracting the sub-NAL unit state data from the entropy state data storage system, and re-starting CABAC on the video stream data, wherein the stopping of the CABAC occurs at a predetermined time.

* * * * *